United States Patent
Okubo et al.

(10) Patent No.: US 6,968,210 B2
(45) Date of Patent: Nov. 22, 2005

(54) RECEIVING APPARATUS

(75) Inventors: Yoichi Okubo, Tokyo (JP); Masaki Suto, Tokyo (JP); Noriyuki Kagaya, Tokyo (JP); Takashi Uchida, Tokyo (JP); Kiyoshi Funada, Tokyo (JP); Kotaro Takenaga, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 490 days.

(21) Appl. No.: 10/176,252

(22) Filed: Jun. 20, 2002

(65) Prior Publication Data

US 2003/0027596 A1 Feb. 6, 2003

(30) Foreign Application Priority Data

Jul. 31, 2001 (JP) .............................. 2001-232929

(51) Int. Cl.[7] .............................................. H04B 1/38
(52) U.S. Cl. ....................... 455/561; 333/99 S; 505/210
(58) Field of Search ................................ 455/560, 561, 455/562.1; 333/99 S, 208; 505/210

(56) References Cited

U.S. PATENT DOCUMENTS 6,212,404 B1 * 4/2001 Hershtig ...................... 455/561
6,571,110 B1 * 5/2003 Patton et al. ................ 455/561

FOREIGN PATENT DOCUMENTS

| JP | 6-164426 | 6/1994 |
| JP | 7-46648 | 2/1995 |
| JP | 2000-236206 | 8/2000 |
| JP | 2002-027109 | 1/2002 |

* cited by examiner

*Primary Examiner*—Lee Nguyen
(74) *Attorney, Agent, or Firm*—John J. Penny, Jr.; Edwards & Angell, LLP

(57) ABSTRACT

The present invention relates to an economical and highly reliable receiving apparatus for receiving radio signals transmitted from a mobile communication terminal within radio zone. The receiving apparatus has antenna sections that receive radio signals transmitted from the mobile communication terminal and are provided in each of a plurality of sectors divided from the radio zone, and receiving units that are provided in each of the antenna sections and that perform a predetermined process to the radio signals received by the antenna section.

16 Claims, 9 Drawing Sheets

RECEIVING APPARATUS

CROSS REFERENCE TO RELATED APPLICATIONS

This patent application claims priority from Japanese patent application No. 2001-232929 filed on Jul. 31, 2001, the contents of which are incorporated herein by reference.

BACKGROUND OF THE INVENTION

1. Field of the Invention

The present invention relates to a receiving apparatus for receiving radio signal that is transmitted from a mobile communication terminal. More particularly, the present invention relates to a receiving apparatus having cooling section that cools receiving unit that performs a predetermined process to the radio signal.

2. Description of the Related Art

Recently, mobile communication terminals such as car phone, mobile phone of PDC (Personal Digital Cellular), or PHS (Personal Handy Phone System), are widely popularized.

These mobile communication terminals transmit and/or receive radio signal with radio base station. The receiving apparatus that is provided as a receiving system of the radio base station, has an antenna section, a receiving unit for performing processes such as amplification of the radio signal that is received in the antenna section, and a receipt processing circuit for performing predetermined signal processes to the radio signal that is, for example, amplified in the receiving unit. The antenna section is provided with a plurality of antennas for diversity, and a plurality of the receiving units and a plurality of receipt processing circuits may be provided, accordingly.

The receiving unit has receipt filter that is provided for removing interference, and amplifier for compensating reduction in noise figure caused by cable loss between the antenna and the receipt processing circuit or distribution loss to the receipt processing circuit. The receiving unit is provided near the antenna. The amplifier is, for example, low noise amplifier (LNA).

On the other hand, in the event that mobile communication terminal is concerned, radio zone covered by one radio base station is divided into a plurality of areas (Each of the areas is referred to as a "sector," hereinafter.), each of which is provided with antenna section, receiving unit, and receipt processing circuit, and thereby, one radio system is constructed for every sector.

However, noise figure of the receiving unit is limited to about 3 db.

It can be considered that the noise of the receiving unit (in particular, amplifier) can be reduced by cooling the entire receiving unit in a cooler or that the noise figure is improved by about 0.5 db for the entire receiving unit by using a receipt filter that is made from high-temperature superconductive material.

However, such a cooler is expensive and does not have sufficient reliability. Therefore, if the cooler is used, the receiving apparatus becomes expensive and its reliability decreases. When a radio zone is divided into a plurality of sectors, or when the radio zone corresponds to diversity, the number of the cooler increases accordingly, thereby increasing costs and decreasing the reliability.

SUMMARY OF THE INVENTION

The objective of the present invention is to provide a receiving apparatus, which is capable of overcoming the above drawbacks accompanying the conventional art. The above and other objects can be achieved by combinations described in the independent claims. The dependent claims define further advantageous and exemplary combinations of the present invention.

The receiving apparatus according to the first aspect of the present invention comprises antenna sections that are provided in each of a plurality of divided sectors of radio zone and that receive radio signal transmitted from a mobile communication terminal, receiving units that are provided in each of the antenna sections and that performs a predetermined process to the radio signal received by the antenna section, and cooling section for cooling two or more receiving units.

The cooling section cools the receiving units provided in a plurality of sectors. Further, the cooling section may cool the same number of the receiving units in every said sector. The antenna and the receipt filter that are provided in each of said plurality of sectors correspond to each other in the plurality of sectors, based on the operation of said antenna section and the receiving unit, and the cooling section cools the receiving units corresponding to each other between the sectors.

The cooling section may cool some of said receiving units among the plurality of said receiving units provided in the predetermined sector. A plurality of the receiving units may be provided in every sector and the cooling section may cool receiving unit belonging to the same sector. Further, the cooling section cools a first receiving unit provided in each of the sectors.

The cooling sections may be two or more. Further, the plurality of the cooling sections cool all of said receiving units provided in each of said sectors.

The receiving unit may have a receipt filter for filtering the radio signal. The receiving unit may further have amplifier for amplifying signal that is obtained using the radio signal. The cooling section cools at least the receipt filter included in the receiving unit. The cooling section may cool the receipt filter and the amplifier that are included in the receiving unit. At least a part of the receipt filter may be made from super-conductive material.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
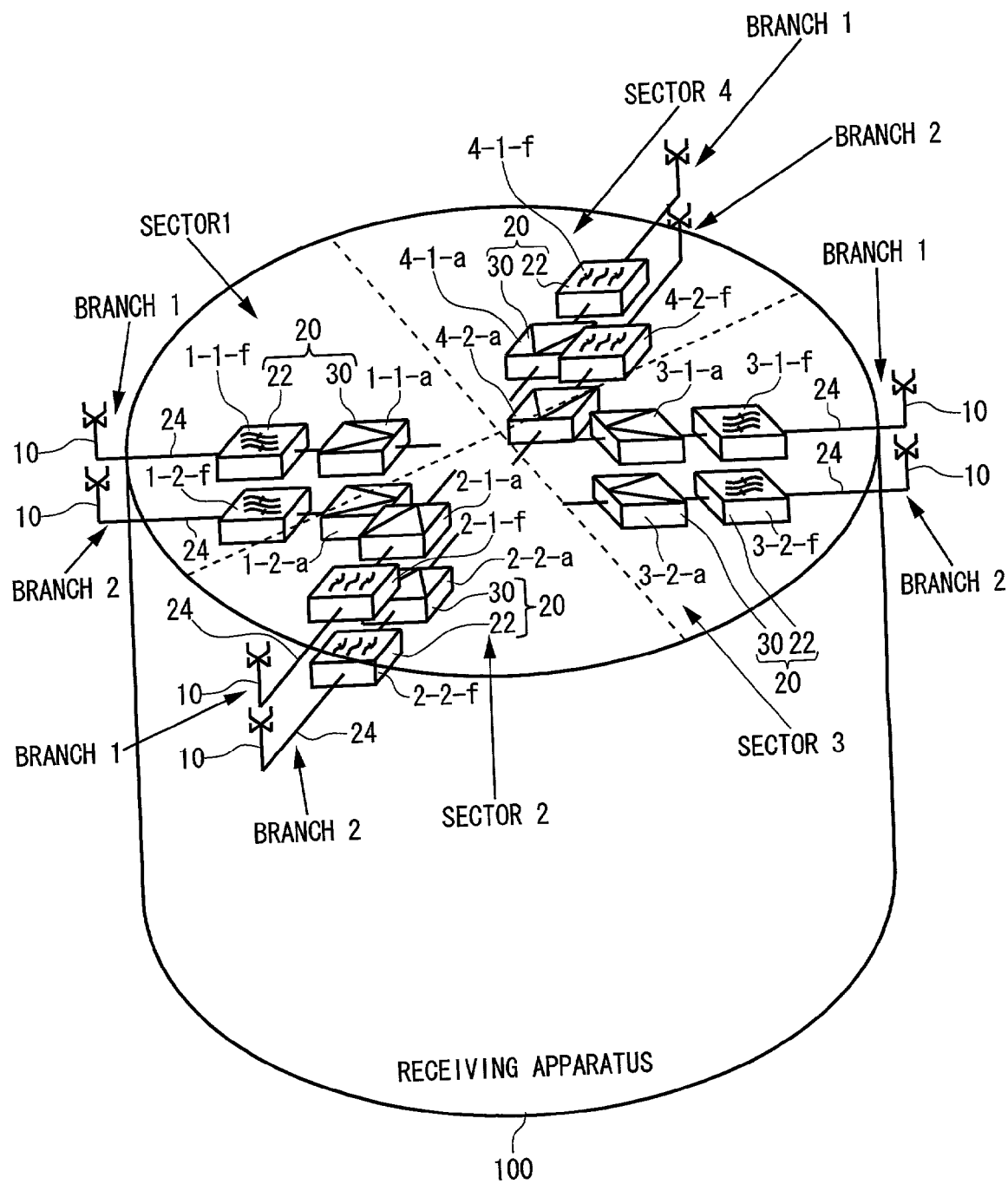
FIG. 1 shows a block diagram of the receiving apparatus according to the first embodiment of the present invention.

FIG. 1 shows a block diagram showing the receiving apparatus according to the first embodiment of the present invention. Receiving apparatus 100 has antenna section 10 having diversity antenna and receiving unit 20 provided near antenna section 10, for example, in each of the four sectors divided from the radio zone covered by one radio base station. Receiving unit 20 has receipt filter 22 for removing interference, and LNA 30 (low noise amplifier) for compensating reduction in noise figure caused by cable loss between antenna section 10 and receipt processing circuit and distribution loss to the receipt processing circuit. In this embodiment, each receipt filter 22 is made from super-conductive material. Receiving unit 20 receives radio signal transmitted from a mobile communication terminal (not shown) that exists in each sector. Antenna section 10, receiving unit 20 and receipt processing circuit constitute one radio system for each sector.

Processing section 50 (shown in FIG. 2 described below) for processing output signal from the plurality of receiving units 20 is provided, in a rear end of receiving unit 20. Processing section 50 has receipt processing circuit and the like, and realizes diversity effect by performing predetermined processes. The antenna system for diversity is referred to as "branch." In this embodiment, the two-branch diversity system using antenna sections 10 of branch 1 and branch 2 will be described in the following.

Antenna section 10, receiving unit 20 and receipt processing circuit constitute one radio system in each sector. In the event that one receiving system consisting of one antenna section 10, receiving unit 20 and receipt processing circuit is regarded as a receiving block, receiving apparatus 100 has a plurality of receiving blocks in each sector. As shown in the figure, receiving apparatus 100 of the first embodiment has two receiving blocks, corresponding to the two antennas for diversity.

In the reference symbols of x-y-f regarding receipt filter 22 and x-y-a regarding LNA 30, "x" represents the sector number divided from the radio zone and "y" indicates the branch number of each antenna. Further, "f" means that the referenced element is receipt filter 22 and "a" means that the referenced element is LNA 30.

Figure 2:
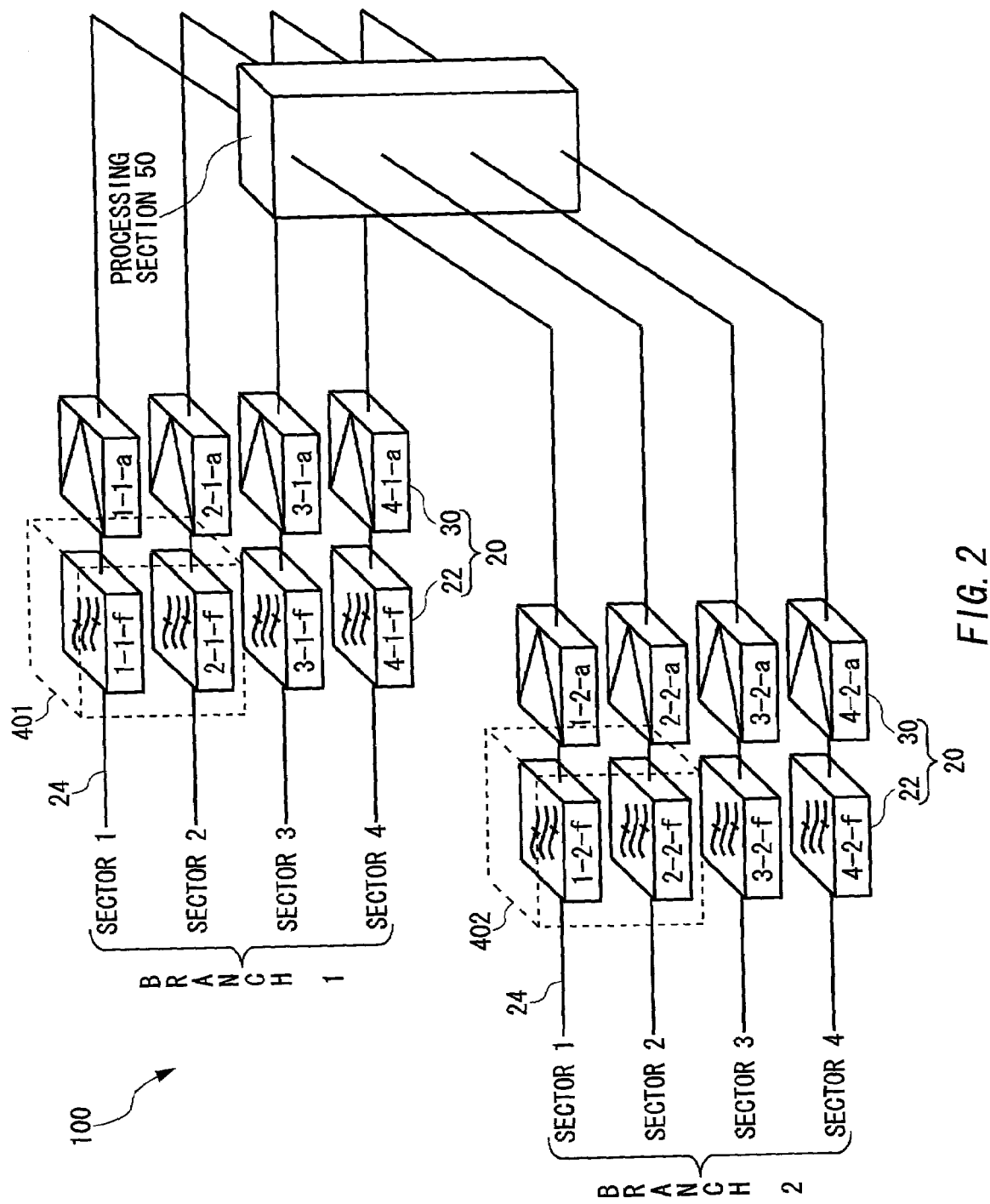
FIG. 2 shows a first example of arrangement of a cooling section of the receiving apparatus according to the first embodiment.

FIG. 2 shows a first example of arrangement of a cooling section for cooling receiving unit 20. In the first example, the radio zone covered by one radio base station is divided into four sectors. In every sector, receiving apparatus 100 has processing section 50 for processing output signal from receiving unit 20 of the two branches that received radio signal, respectively, in rear end of LNA 30 of the apparatus. Processing section 50 has receipt processing circuit and, for example, performs processes for obtaining diversity effect. Further, in every branch, receiving apparatus 100 has two cooling sections 401, 402 for cooling receipt filter 22 within the two receiving units 20. Cooling sections 401 and 402 have a chamber (case) surrounding receipt filter 22 and cooler that is housed within the chamber. The chamber is maintained as being substantially vacuum.

In the figure, the reference symbols with respect to receipt filter 22 and LNA 30 are the same as FIG. 1. In the following examples, the meanings of reference symbols are the same as described above.

The cooler uses, for example, heat exchange cycle where helium gas is compressed and expanded and is very low temperature cooler that can maintain very low temperature of dozens of Kelvin (K) for long time.

In the first example, one cooling section 401 or 402 cools two receipt filters 22 of 1-1-$f$ and 2-1-$f$ among each receiving unit 20. Cooling sections for cooling other receipt filter 22 (for example, 3-1-$f$ and the like) and LNA 30 are not provided. That is, all LNAs 30 may be used in the room temperature or higher temperature than the temperature within the cooling section.

In the first example, since one cooling section 401 or 402 cools two receipt filters, noise figure of the received signal can be improved and the numbers of cooling sections can be decreased compared to the conventional structure in which one cooling section cools one receipt filter 22, thereby saving the cost.

Further, the cooling section is provided in every branch. Generally, since the cooling sections in both branches usually do not malfunction at the same time, even if a cooling section in one branch becomes malfunction, the cooling section in the other branch would normally operate. Thus, the performance of a radio system of each sector does not fallen off drastically. (This is referred to as "unique effect of the first embodiment", hereinafter.)

Figure 3:
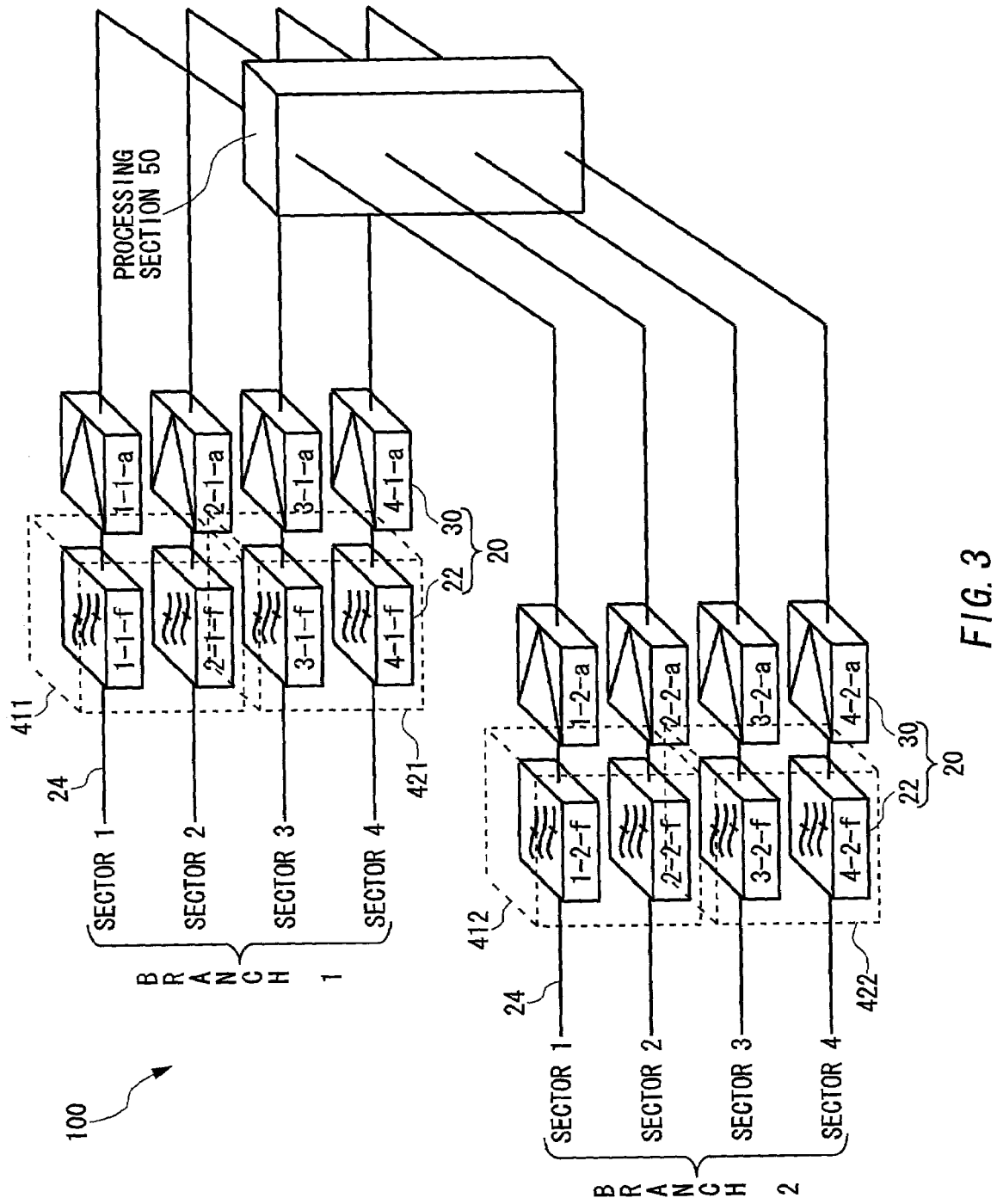
FIG. 3 shows a second example of arrangement a cooling section of the receiving apparatus according to the first embodiment.

FIG. 3 shows a second example of arrangement of a cooling section of receiving apparatus 100 of the first embodiment. Receiving apparatus 100 has cooling sections for cooling receipt filter 22 within two receiving units 20. That is, the number of cooling sections provided in each branch is determined so that all of receipt filters 22 belonging to a plurality of sectors can be cooled. (In this example, the number of cooling sections is two for each branch.) Cooling sections 411, 412, 421, 422 cool the same number of receipt filter 22, respectively. On the other hand, cooling section for cooling each LNA 30 is not provided. That is, all LNAs 30 may be used in the room temperature or higher temperature than the temperature within the cooling section.

In the second example, the number of cooling sections can be lowered compared to the conventional structure in which one cooling section is required to cool one receipt filter 22, thereby saving the cost, as in the first embodiment. Further, in the second example, since the cooling section is provided in every branch, the unique effect of the first embodiment also can be provided.

Figure 4:
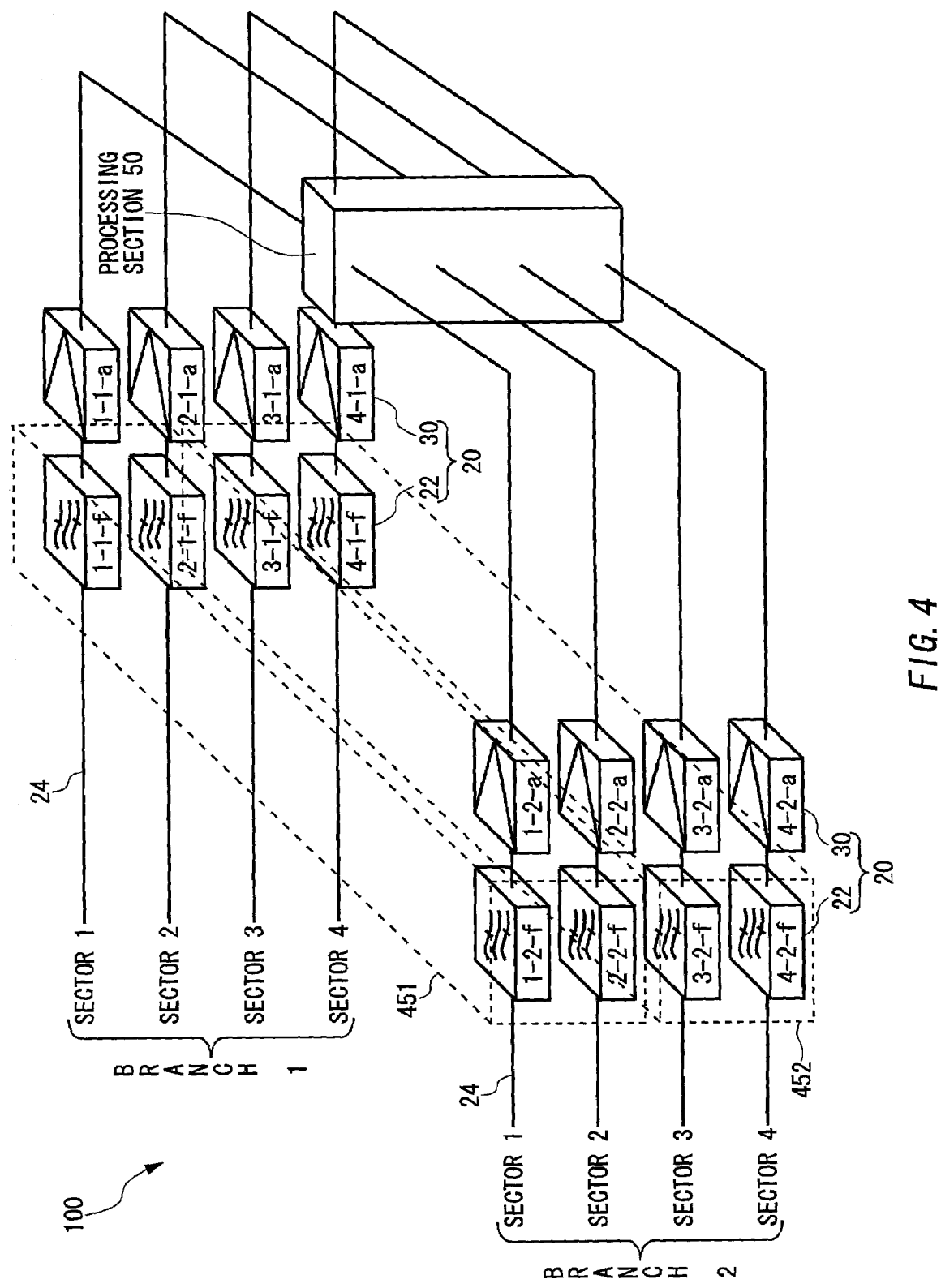
FIG. 4 shows a third example of arrangement of a cooling section of the receiving apparatus according to the first embodiment.

FIG. 4 shows a third example of arrangement of a cooling section of receiving apparatus 100 of the first embodiment. Receiving apparatus 100 has two cooling sections 451, 452 that cool receipt filter 22 within two receiving unit 20 belonging to one sector, along with cooling receipt filter 22 within the receiving unit belonging to the other sector. That is, the number of cooling sections (in this example, two) to be provided is determined so that all of receipt filters 22 belonging to a plurality of branches and sectors can be cooled. Cooling sections 451, 452 cool the same number of receipt filter 22, respectively.

The third example can provide the same effects of the second example. However, since one cooling section cools receipt filters 22 in all branches within the sector at the same time, the unique effect of the first embodiment cannot be provided. However, the number of the cooling sections can be decreased.

Figure 5:
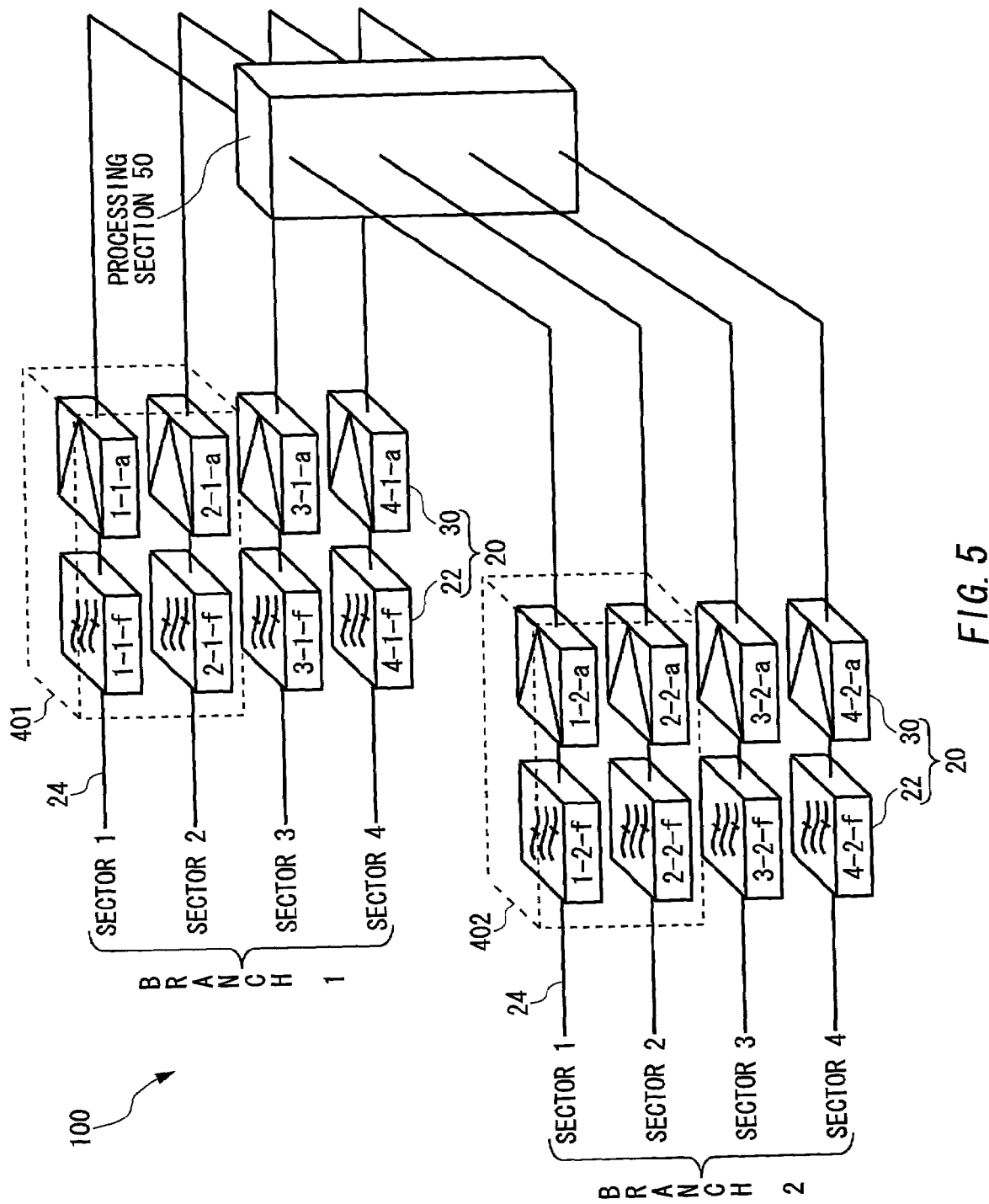
FIG. 5 shows a fourth example of arrangement of a cooling section of the receiving apparatus according to the first embodiment.

FIG. 5 shows a fourth example of arrangement of a cooling section of receiving apparatus 100 of the first embodiment. Receiving apparatus 100 has cooling sections 401, 402 for cooling receipt filter 22 and LNA 30 within two receiving units 20 in each branch. In the fourth example, cooling section 401 cools receipt filters 22 of 1-1-f and 2-1-f and LNA 30 in each receiving unit 20. Cooling section for cooling other receiving units 22 (such as 3-1-f) and LNA 30 (such as 3-1-a) is not provided.

In the fourth example, since one cooling section 401 cools two receipt filters 22 and LNA 30, i.e., since a cooling section cools LNA as well as receipt filter, noise figure of the received signal can be more improved compared to the first to third examples.

Further, since the cooling section is provided in each branch, the fourth example can provide the unique effect of the first embodiment.

Figure 6:
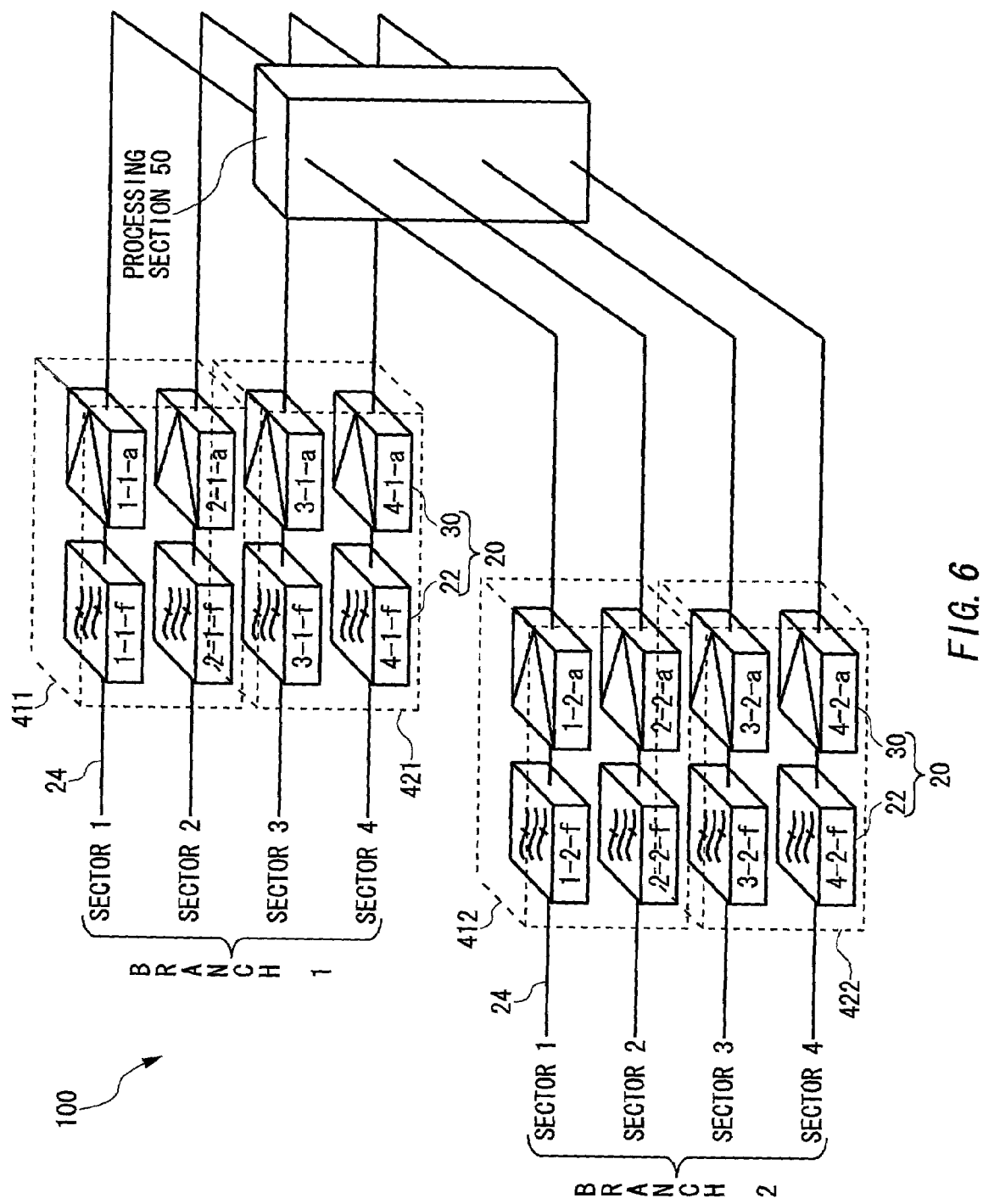
FIG. 6 shows a fifth example of arrangement of a cooling section of the receiving apparatus according to the first embodiment.

FIG. 6 shows a fifth example of arrangement of a cooling section of receiving apparatus 100 of the first embodiment. Receiving apparatus 100 has four cooling sections 411, 421, 412, 422 for cooling receipt filter 22 and LNA 30 within two receiving units 20. That is, the number of cooling sections are determined so that all of receipt filters 22 and LNA 30 that belong to a plurality of sectors can be cooled. The cooling sections cool the same number of receipt filter 22 and LNA 30, respectively.

The fifth example also provides cost reduction as the above-mentioned examples in cost reduction, since the number of cooling sections is decreased compared to the conventional arrangement in which one cooling section is required to cool one receipt filter 20. Since the cooling section is provided in each branch, in the fifth example, the unique effect of the first example also can be provided.

Figure 7:
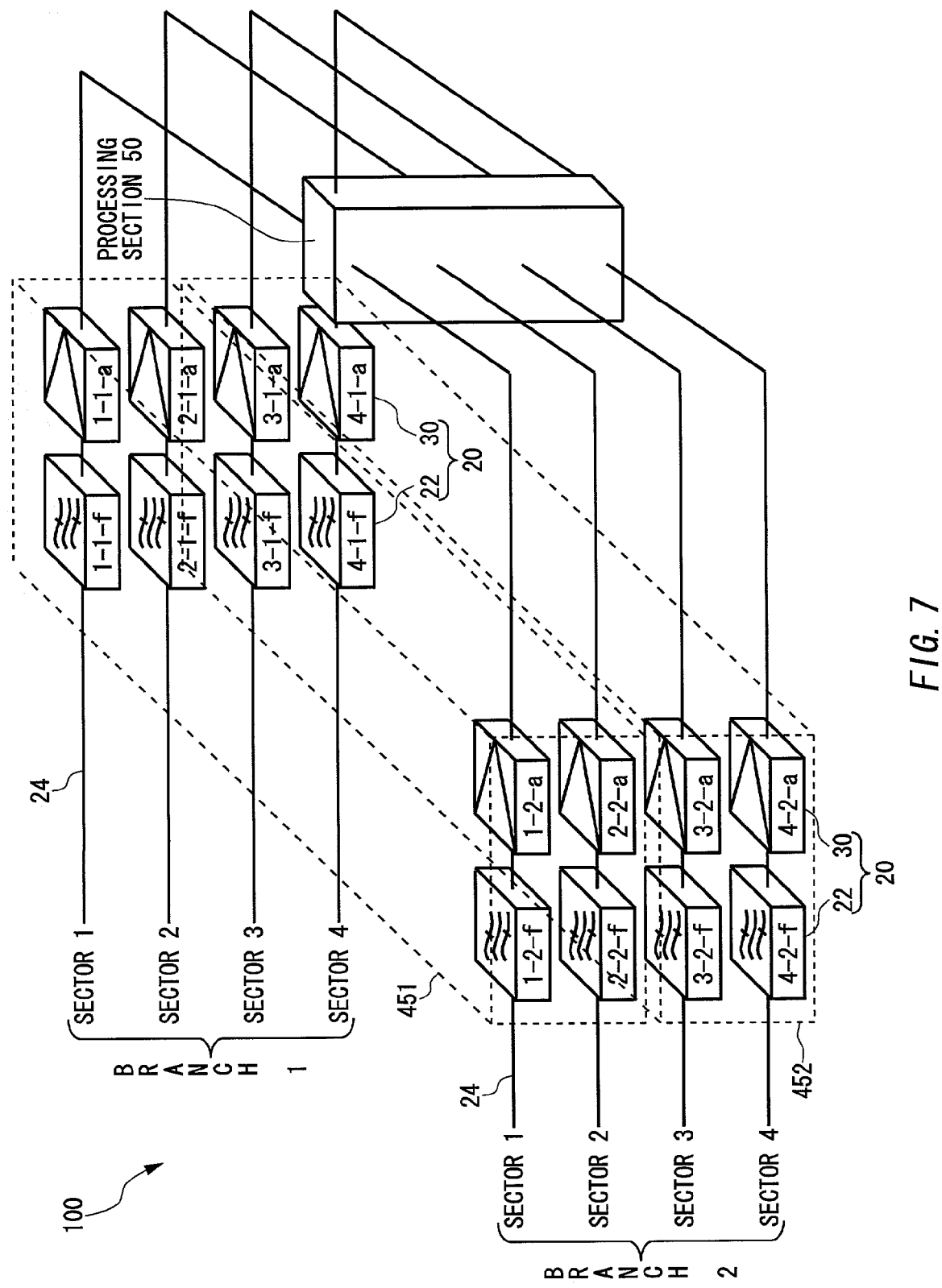
FIG. 7 shows a sixth example of arrangement of a cooling section of the receiving apparatus according to the first embodiment.

FIG. 7 shows a sixth example of arrangement of a cooling section of receiving apparatus 100 of the first embodiment. In the sixth example, cooling sections 451, 452 of the third example are modified to cool LNA 30 as well as receipt filter 22. The sixth example provides the same effects as the third example.

In the first embodiment, it is described that the cooling section cools a plurality of receipt filters 22 and/or LNA 30. However, other embodiment may be possible as long as each of the cooling section cools two or more receiving units. For example, if each of the receiving units includes receipt filter and amplifier, the cooling section may cool at least one of the receipt filter and the amplifier in the receiving unit.

Although the present invention has been described by way of exemplary embodiments, the scope of the present invention is not limited to the embodiments. Those skilled in the art might make many changes and improvements. It is clearly understood from the claims that the changes and improvements fall within the scope of the present invention.

In the first, second, third, fourth, fifth and sixth examples, the object to be cooled is combinations of sectors 1 and 2, and sectors 3 and 4. However, the object to be cooled maybe combinations of sectors 2 and 3, and sectors 1 and 4.

Figure 8:
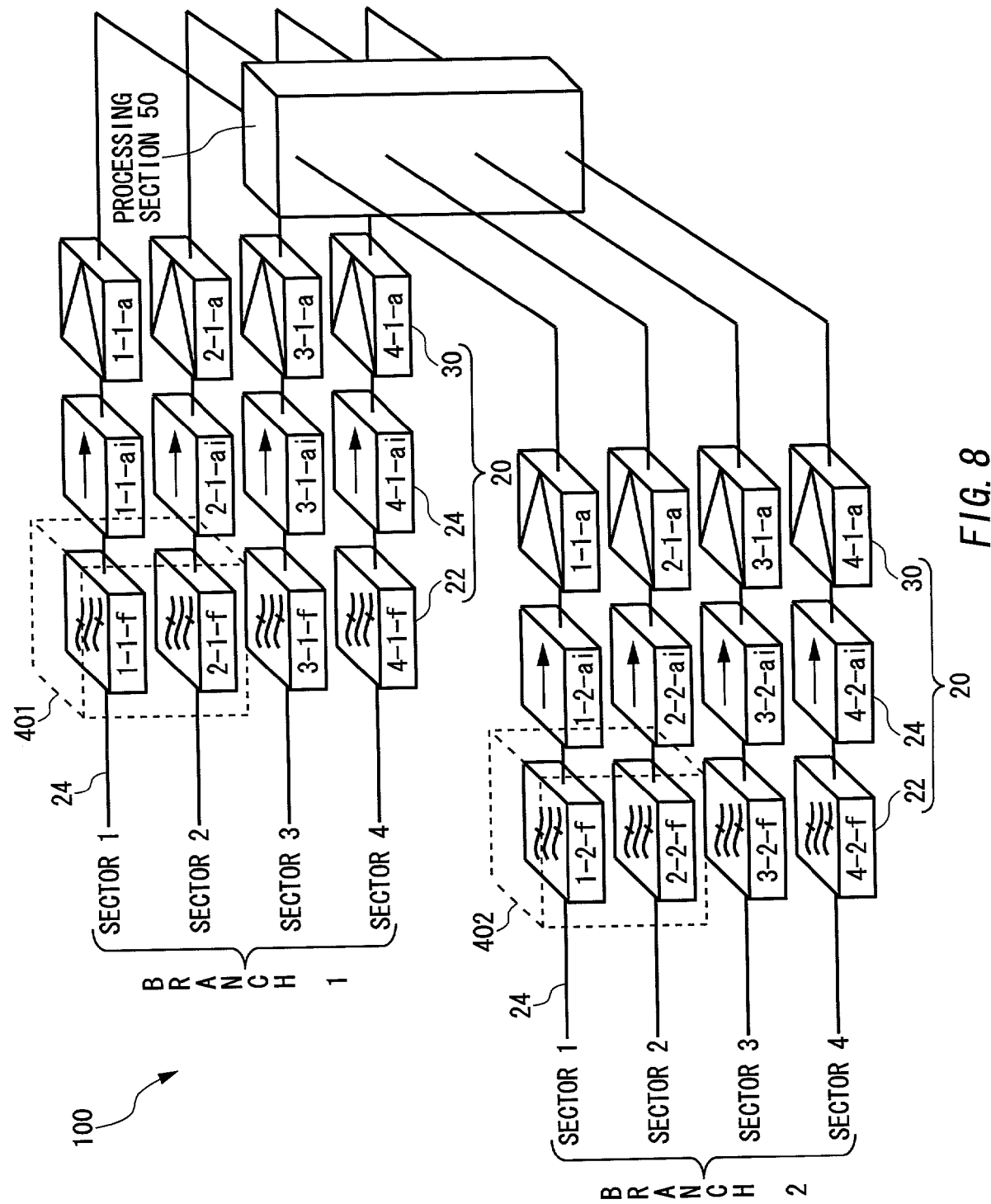
FIG. 8 shows other embodiment of receiving unit 20.
Figure 9:
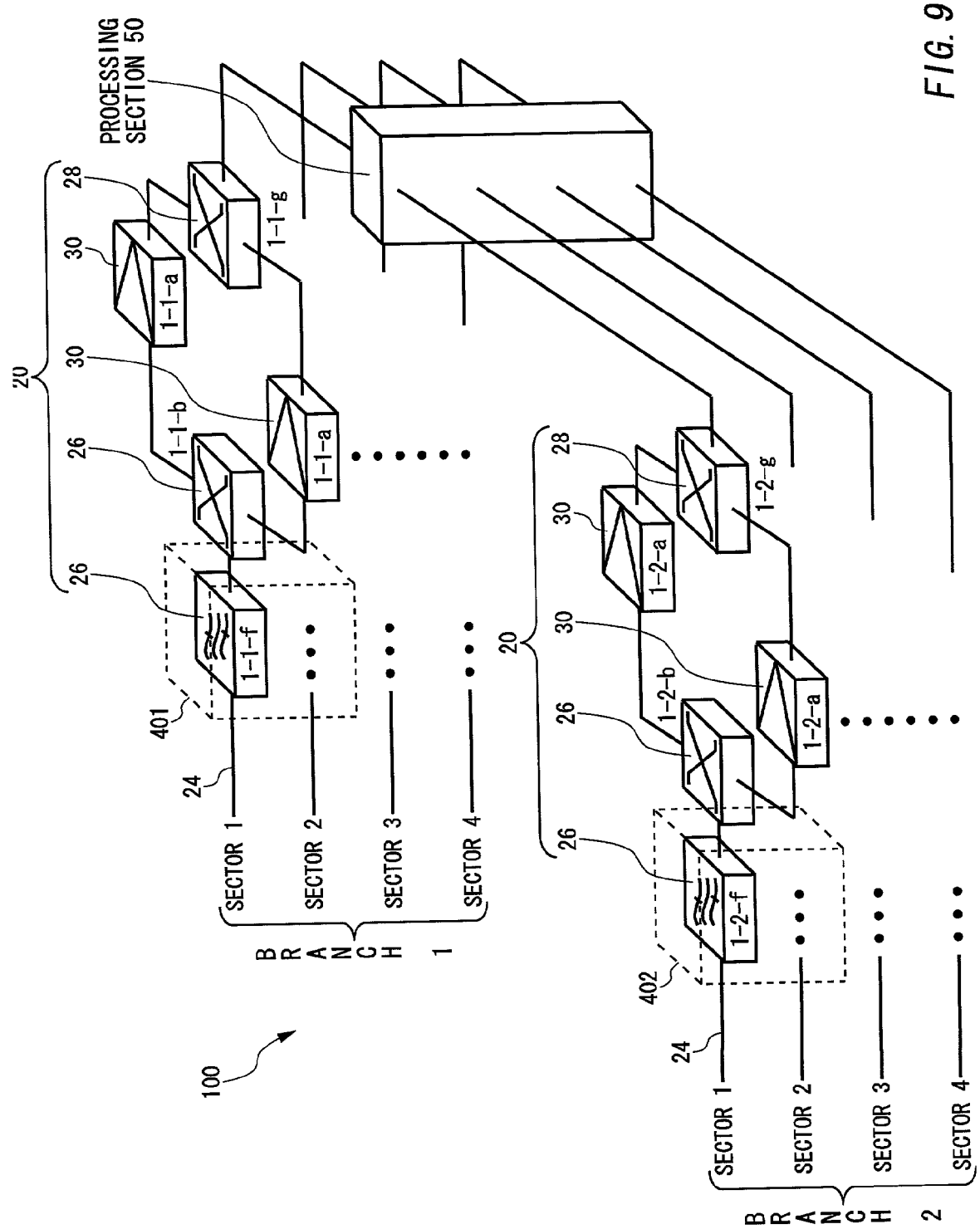
FIG. 9 shows another embodiment of receiving unit 20.

Further, in the examples, receiving unit 20 consists of receipt filter 22 and LNA 30. However, as shown in FIG. 8, the receiving unit may include a circuit where receipt filter 22, isolator 24 (using symbol of 1-1-ai and the like) and amplifier 30 are connected in series. Further, as shown in FIG. 9, the receiving unit may include a circuit wherein distributor 26 (indicated by reference symbol of 1-1-b and the like) and synthesizer 28 (indicated by reference symbol of 1-1-g and the like) are arranged in this order and a plurality of amplifiers 30 (for example, two) are parallel connected between distributor 26 and synthesizer 28. It is shown in FIGS. 8 and 9 that only receipt filter 22 is cooled by cooling sections 401, 402, but amplifier 30 also may be cooled. Further, the entire receiving unit including isolator 24 and distributor 26 and the like may be cooled by cooling section 401, 402.

According to the receiving apparatus of the present invention, the number of cooling sections (that is, cooler) can be decreased compared to the conventional arrangement in which one cooling section is required to cool one receipt filter, and thus the cost can be saved. Further, in the event that the cooler is provided in each branch, even if a cooler of a branch becomes disabled, the system is prevented from stopping since the cooler of the other branch would operate.

What is claimed is:

1. A receiving apparatus receiving radio signal transmitted from a mobile communication terminal within radio zone covered by a radio base station, the receiving apparatus comprising:

antenna sections operable to receive radio signal transmitted from the mobile communication terminal, said antenna sections being provided in each of a plurality of divided sectors of the radio zone;

a receiving unit provided in each of said antenna sections operable to perform a predetermined process to the radio signal received by said antenna section; and a cooling section for cooling two or more of said receiving units located in different sectors.

2. The receiving apparatus according to claim 1, wherein said cooling section cools the same number of said receiving units in each of said sectors.

3. The receiving apparatus according to claim 2, wherein said antenna section and said receiving unit, which are provided in each of said plurality of sectors, correspond to each other in the plurality of sectors based on the operation of said antenna section and the receiving unit, and said cooling section cools said receiving units corresponding to each other between said sectors.

4. The receiving apparatus according to claim 3, wherein said cooling section cools some of said receiving units among the plurality of said receiving units provided in the predetermined sector.

5. The receiving apparatus according to claim 4, wherein said cooling section comprises a plurality of cooling units.

6. The receiving apparatus according to claim 5, wherein said plurality of cooling units cool all of said receiving units provided in each of said sectors.

7. The receiving apparatus according to claim 2, wherein said cooling sections cools a first receiving units provided in each of said sectors.

8. The receiving apparatus according to claim 7, wherein said cooling section comprises a plurality of cooling units.

9. The receiving apparatus according to claim 8, wherein said plurality of cooling units cool all of said receiving units provided in each of said sectors.

10. The receiving apparatus according to claim 1, wherein a plurality of said cooling sections are provided.

11. The receiving apparatus according to claim 10, wherein the plurality of said cooling sections cool all of said receiving units provided in each of said sectors.

12. The receiving apparatus according to claim 1, wherein said receiving unit has a receipt filter for filtering said radio signal.

13. The receiving apparatus according to claim 12, wherein said receiving unit further comprises an amplifier for amplifying signal that is obtained using said radio signal.

14. The receiving apparatus according to claim 13, wherein said cooling section cools at least said receipt filter of said receiving unit.

15. The receiving apparatus according to claim 13, wherein said cooling section cools said receipt filter and said amplifier that are included in said receiving unit.

16. The receiving apparatus according to claim 12, wherein at least a part of said receipt filter is made from super-conductive material.

* * * * *